(12) United States Patent
Zhang

(10) Patent No.: US 11,920,259 B2
(45) Date of Patent: Mar. 5, 2024

(54) WASHABLE FLAME RETARDANT VISCOSE FABRIC

(71) Applicant: Zhejiang Aimeng New Material Technology Co., Ltd., Jiaxing (CN)

(72) Inventor: Tianjun Zhang, Zhejiang (CN)

(73) Assignee: Zhejiang Almeng New Material Technology Co., Ltd., Jiaxing (CN)

( * ) Notice: Subject to any disclaimer, the term of this patent is extended or adjusted under 35 U.S.C. 154(b) by 115 days.

(21) Appl. No.: 17/676,823

(22) Filed: Feb. 22, 2022

(65) Prior Publication Data

US 2023/0072657 A1 Mar. 9, 2023

(30) Foreign Application Priority Data

Sep. 8, 2021 (CN) .......................... 202111050635.9

(51) Int. Cl.
| | | |
|---|---|---|
| *D01F 2/10* | (2006.01) | |
| *D01D 1/02* | (2006.01) | |
| *D01D 5/06* | (2006.01) | |
| *D01F 1/07* | (2006.01) | |
| *D02G 3/02* | (2006.01) | |
| *D02G 3/44* | (2006.01) | |
| *D04B 1/16* | (2006.01) | |
| *D04B 21/16* | (2006.01) | |

(52) U.S. Cl.
CPC .................. *D01F 2/10* (2013.01); *D01D 1/02* (2013.01); *D01D 5/06* (2013.01); *D01F 1/07* (2013.01); *D02G 3/02* (2013.01); *D02G 3/443* (2013.01); *D04B 1/16* (2013.01); *D04B 21/16* (2013.01); *D10B 2201/24* (2013.01)

(58) Field of Classification Search
None
See application file for complete search history.

(56) References Cited

U.S. PATENT DOCUMENTS 2,668,784 A * 2/1954 Dills ...................... D06M 11/20
252/608

* cited by examiner

*Primary Examiner* — Shawn Mckinnon
(74) *Attorney, Agent, or Firm* — Jeenam Park

(57) ABSTRACT

The disclosure discloses a washable flame retardant viscose fabric. The viscose fabric includes a flame retardant viscose fiber; and a method of preparing the viscose fiber includes the following steps: impregnation, squeezing, ageing, yellowing, addition before spinning, spinning, bundling, drafting, cutting off, first washing, desulfurization, second washing, pickling, third washing, application of oil bath, drying, and packaging. Before spinning, an aqueous dispersion of flame retardant, an aqueous dispersion of hyperbranched nanocellulose and a dispersant are uniformly added to a spinning glue using a pre-spinning injection system. During the production of the flame retardant viscose used, the aqueous dispersion of flame retardant, the aqueous dispersion of hyperbranched nanocellulose and the dispersant are introduced into the spinning glue by the pre-spinning injection system before spinning, so that the flame retardant has a high residual rate in the subsequent coagulation bath.

5 Claims, No Drawings

WASHABLE FLAME RETARDANT VISCOSE FABRIC

TECHNICAL FIELD

The present invention relates to the technical field of flame retardant viscose fabrics, and in particular to a washable flame retardant viscose fabric.

BACKGROUND

Currently, flame retardant fabrics mainly include: post-finishing flame retardant fabrics, such as pure cotton, terylene cotton, etc.; inherently flame retardant fabrics, such as aramid, acrylic cotton, DuPont Kevlar, Nomex, Australia PR97, etc. Market analysis shows an extremely good development momentum of flame retardant (FR) technology in North America, Central America and Europe. John Phifer, technical marketing manager of Apexical, Inc. in Spartanburg (formerly Apex Chemical Corporation), South Carolina, asserted that such situation indicated a booming market and called for innovation; especially interested in techniques satisfying the California/Consumer Product Safety Commission (CPSC) bedding standards and non-halogen flame retardant treatment.

Ordinary viscose staple fibers have been developed for 100 years till now, and the quality index requirements and testing methods thereof are recorded in GB/T14463-2008, which do not have flame retardant properties and can only be used in traditional ordinary weaving industry. Flame retardant fibers are generally used in special operating environments and the field of household items, as clothing, decoration, industrial cloth, etc., with two main categories. One is permanent flame retardant fibers mainly including permanent flame retardant polyester or aramid, acrylic cotton, DuPont Kevlar, Nomex and the like. At present, many permanent flame retardant fibers have relatively good flame retardant properties, but meanwhile may cause secondary damage as a special protective fabric due to their relatively large heat shrinkage, and they have poor wearabilities such as moisture absorption and breathability. The other is fibers or textiles with flame retardant attached on the surface, which are not resistant to washing and sunlight. After long-term use, the flame retardant component on the surface falls off and fails, and the flame retardant properties do not meet the design requirements. Chinese invention application, with the publication number CN1904156A, discloses a flame retardant viscose staple fiber and production process thereof, where a flame retardant is added in the viscose fiber production process to reach a permanent flame retardant viscose fiber. However, the flame retardant added is not well dispersed and has a low residual rate, resulting in poor flame retardant effect of the flame retardant viscose. The existing viscose staple fibers, when being used in textile production, especially in flame retardant textile products, cannot well exert the function of flame retardancy, with unsatisfactory flame retardant effect. Therefore, it is urgent to develop a highly flame retardant viscose staple fiber yarn that can concurrently meet the requirements of 16 CFR Part 1633 and the British standard BS5852.

SUMMARY

The objective of the present invention is to provide a washable flame retardant viscose fabric, where an aqueous dispersion of flame retardant, an aqueous dispersion of hyperbranched nanocellulose and a dispersant are introduced before spinning, so that the flame retardant has a high residual rate in the subsequent coagulation bath. In this regard, the utilization rate of the flame retardant is enhanced, and the dispersibility of the flame retardant and nanocellulose is improved, such that the flame retardant is more uniformly dispersed.

In order to solve the above technical problems, the objective of the present invention is achieved as follows:

The present invention relates to a washable flame retardant viscose fabric, the viscose fabric includes a flame retardant viscose fiber, and a method of preparing the viscose fiber includes the following steps:

(1) impregnation: putting a cellulose pulp into an impregnation tank, wherein a temperature of an impregnation solution is 56-58° C., impregnation time is 30-35 min, a concentration of the impregnation solution is 220-235 g/L, and V-388 used accounts for 0.08-0.10% of a content of methylcellulose;

(2) squeezing: squeezing and crushing a raw material with a squeezer, with a fixed weight-volume ratio of 130-140 g/L;

(3) ageing: subjecting the crushed raw material to an ageing at a temperature of 52-55° C., wherein an outlet copper viscosity is 50-52 mp;

(4) yellowing: adding carbon disulfide at an amount of 32-34% of the content of methylcellulose for yellowing for 25-35 min at a temperature of 25-30° C.;

(5) addition before spinning: before spinning, uniformly adding an aqueous dispersion of flame retardant, an aqueous dispersion of hyperbranched nanocellulose and a dispersant to a spinning glue using a pre-spinning injection system; wherein the aqueous dispersion of flame retardant contains 180-200 g/L sodium metasilicate; the aqueous dispersion of hyperbranched nanocellulose contains 50-100 g/L hyperbranched polyamide functionalized nanocellulose and ethylenediamine modified nanocellulose; and the sodium metasilicate accounts for 44-46% of the content of methylcellulose calculated based on silicon dioxide;

(6) spinning: a temperature of the coagulation bath is 45-55° C., a concentration of sulfuric acid is 110-135 g/L, a concentration of zinc sulfate is 25-35 g/L, a concentration of aluminum sulfate is 10-15 g/L, a concentration of sodium sulfate is 270-300 g/L, a concentration of orthosilicic acid is 10-15 g/L, and an acid bath drop is 6-12 g/L;

(7) bundling: steam pressures before and after the bundling are 0.25 MPa and 0.15 MPa, respectively, a supplementary water temperature of a plasticizing tank is greater than or equal to 80° C., an acid content of the plasticizing tank is 20-35 g/L, a main condensation bridge temperature is less than or equal to 50° C., and a final condensation temperature is less than or equal to 25° C.;

(8) drafting: a drafting ratio from a spinneret to a godet is 30-60%, a drafting ratio from the godet to a first set is 20-40%, and a drafting ratio from the first set to a second set is 7-12%, and a total drafting ratio is 80-150%;

(9) cut offing;

(10) first washing: performing a washing at room temperature;

(11) desulfurization: conducting a desulfurization using a sodium sulfite solution, wherein a concentration of the sodium sulfite solution is 4-8 g/L, and a temperature of the sodium sulfite solution is 75-80° C.;

(12) second washing: performing a washing at room temperature;
(13) pickling: conducting a pickling using hydrochloric acid with a pH of 4-6 and room temperature;
(14) third washing: performing a washing at 45-55° C.;
(15) application of oil bath: an oil solution used has a concentration of 3-6 g/L, a temperature of 45-55° C., and a pH of 7-8.5;
(16) drying and packaging.

On the basis of the above scheme and as a preferred technical solution: the viscose fabric is a knitted fabric woven by a flame retardant viscose yarn, and the flame retardant viscose yarn is prepared by subjecting the flame retardant viscose fiber to a ring spinning.

On the basis of the above scheme and as a preferred technical solution: a method of preparing the flame retardant viscose yarn includes the following steps:
(a) opening and cleaning processes: putting a flame retardant viscose on a round blow table to be grabbed, wherein a falling speed of a cotton catcher of a scutcher is 2 mm each time, a rotation speed is 960 r/min, a rotating trolley speed is 2.8 r/min, and a blade portion extending out of a rib is 2 mm, a catcher speed is 800 r/min, a fan speed is 950 r/min, a gauge of catcher and pedal roller is 12 mm, a lap roller speed is 12 r/min, a lap dry weight is 350 g/m, and a lap length is 30.9 m;
(b) carding process: a cylinder speed is 280 r/min, a licker-in roller speed is 590 r/min, a doffer speed is 15.8 r/min, a cover speed is 89 mm/min, a gauge of cylinder and licker-in is 7 mil, a gauge of feeding plate and linker-in is 20 mil, a gauge of cylinder and doffer is 4 mil, a gauge of cylinder and five points on the cover plate is 10 mil×9 mil×8 mil×8 mil×9 mil, and a dust removal knife has a height aligned with the frame, and the back of the knife is at an angle of 90° relative to the horizontal plane of the frame;
(c) drawing process: conducting a three passages drawing each using 7 cotton slivers and having a bell mouth of 3 mm, wherein the dry weight of the first-passage drawing is 17.5 g/5 m, the roller gauge is 12 mm×20 mm, and the mechanical drafting is 6.3 times, the rear zone drafting is 1.6 times; the dry weight of the second-passage drawing is 17.5 g/5 m, the roller gauge is 12 mm×20 mm, the mechanical drafting is 6.86 times, and the rear zone drafting is 1.4 times; the dry weight of the third-passage drawing is 17.5 g/5 m, the roller gauge is 18 mm×25 mm, the mechanical drafting is 6.86 times, the rear zone drafting is 1.3 times, and the third-passage drawing is detected as being within 4.5% using a USTER tester;
(d) roving process: a roving twist is 3.2 twists/10 cm, a roller gauge is 28 mm×38 mm, a rear zone drafting is 1.17 times, a nip gauge is 9 mm, a roving dry weight is 5.26 g/10 m, a mechanical drafting is 6.8 times, a front roller speed is 200 r/min, a wet weight is 5.63 g/10 m, a tex number is 563 tex, a twist coefficient is 76, a front roller diameter is 28 mm, and a number of pressing palm windings is 2;
(e) spinning process: a mechanical drafting multiple is 31.92 times, a roller gauge is 22 mm×41 mm, a rear zone drafting multiple is 1.18 times, a nip gauge is 3.5 mm, a front roller diameter is 27 mm, a front roller speed is 158 r/min; the prepared flame retardant viscose yarn has 10-20 counts, the twist is 480-710 T/m, and the twist direction is S.

On the basis of the above scheme and as a preferred technical solution: the viscose fabric is a rib fabric or a single jersey knitted fabric woven by the flame retardant viscose yarn.

On the basis of the above scheme and as a preferred technical solution: the hyperbranched polyamide functionalized nanocellulose and ethylenediamine modified nanocellulose are mixed at a ratio of (1-2):1; the dispersant is polyvinyl alcohol.

The beneficial effects of the present invention are as follows. For the washable flame retardant viscose fabric of the present invention, during the production of the flame retardant viscose used, the aqueous dispersion of flame retardant, the aqueous dispersion of hyperbranched nanocellulose and the dispersant are introduced into the spinning glue by a pre-spinning injection system before spinning, so that the flame retardant has a high residual rate in the subsequent coagulation bath. In this regard, the utilization rate of the flame retardant is enhanced, and the dispersibility of the flame retardant and nanocellulose is improved, such that the flame retardant is more uniformly dispersed. The residual rate of flame retardant exceeds 95%, and the limiting oxygen index exceeds 33%.

DETAILED DESCRIPTION OF THE EMBODIMENTS

The present invention is further illustrated in conjunction with the following specific embodiments.

Embodiment 1

The present embodiment relates to a washable flame retardant viscose fabric, the viscose fabric includes a flame retardant viscose fiber; the viscose fabric is a knitted fabric woven by a flame retardant viscose yarn, and the flame retardant viscose yarn is prepared by subjecting the flame retardant viscose fiber to a ring spinning. The viscose fabric is a rib fabric or a single jersey knitted fabric woven by the flame retardant viscose yarn. A method of preparing the viscose fiber includes the following steps:
(1) Impregnation: a cellulose pulp is put into an impregnation tank, a temperature of an impregnation solution is 56° C., impregnation time is 30 min, a concentration of the impregnation solution is 220 g/L, and V-388 used accounts for 0.08% of a content of methylcellulose.
(2) Squeezing: a raw material is squeezed and crushed with a squeezer, with a fixed weight-volume ratio of 130 g/L.
(3) Ageing: the crushed raw material is subjected to an ageing at a temperature of 52° C., and the outlet copper viscosity is 50 mp.
(4) Yellowing: carbon disulfide is added at an amount of 32% of the content of methylcellulose for yellowing for 25 min at a temperature of 25° C.
(5) Addition before spinning: before spinning, an aqueous dispersion of flame retardant, an aqueous dispersion of hyperbranched nanocellulose and a dispersant are uniformly added to a spinning glue using a pre-spinning injection system.

The aqueous dispersion of flame retardant contains 180 g/L sodium metasilicate; the aqueous dispersion of hyperbranched nanocellulose contains 50 g/L hyperbranched polyamide functionalized nanocellulose and ethylenediamine modified nanocellulose. The sodium metasilicate accounts for 44% of the content of methylcellulose calculated based on silicon dioxide.

Further, the hyperbranched polyamide functionalized nanocellulose and ethylenediamine modified nanocellulose are mixed at a ratio of (1-2):1; the dispersant is polyvinyl alcohol.

The sodium metasilicate is dissolved and added as a dissolving solution to the spinning glue to ensure that the flame retardant is dispersed in the flame retardant viscose in the form of nano metasilicic acid. The addition of a large amount of sodium metasilicate solution greatly changes the viscose composition. Although the alkali content in the viscose has been significantly increased, which is conducive to the stability of the dissolution and maturation of the flame retardant viscose, it will also decrease the diffusion speed and penetrability of the flame retardant viscose, which is not conducive to the dissolution of fibrous xanthate, and may greatly increase the number and the diameter of gel particles in the flame retardant viscose, cause the sodium metasilicate to penetrate into the external solution during the subsequent coagulation and washing processes, resulting a low flame retardant sodium metasilicate residual rate. In order to improve the binding ability of sodium metasilicate with cellulose in the flame retardant viscose, the hyperbranched polyamide functionalized nanocellulose and ethylenediamine modified nanocellulose are added, both of which can be well combined with cellulose. In addition, a cavity can be formed between the various hyperbranched branches for receiving sodium metasilicate, so that the sodium metasilicate will not penetrate into the external solution in the subsequent treatment process, and can remain within the flame retardant viscose. Since the addition of hyperbranched polyamide functionalized nanocellulose and ethylenediamine modified nanocellulose will increase the viscosity of the spinning glue, hindering the flame retardant to fully and uniformly mix with the spinning glue, polyvinyl alcohol is added therein as a dispersant to improve the dispersibility of sodium metasilicate, hyperbranched polyamide functionalized nanocellulose and ethylenediamine modified nanocellulose, so that the flame retardant performance of the prepared flame retardant viscose fiber is more uniform.

(6) Spinning: a temperature of the coagulation bath is 45° C., a concentration of sulfuric acid is 110 g/L, a concentration of zinc sulfate is 25 g/L, a concentration of aluminum sulfate is 10 g/L, a concentration of sodium sulfate is 270 g/L, a concentration of orthosilicic acid is 10 g/L, and an acid bath drop is 6 g/L.

The main function of zinc sulfate and aluminum sulfate is to solidify the viscose liquid and resist the dissociation of sulfuric acid, decelerating the regeneration of cellulose xanthate. In addition, there are three special effects: First, they can interact with sodium cellulose xanthate to generate zinc cellulose xanthate and aluminum cellulose xanthate. The decomposition of zinc cellulose xanthate and aluminum cellulose xanthate in the coagulation bath is much slower than that of sodium cellulose xanthate, leading to a mild coagulation and regeneration of viscose stream. Complete decomposition occurs after strong stretch, thereby reducing fiber breakage, improving fiber spinnability, and resulting in fibers with a relatively high strength and elongation indexes. Second, zinc cellulose xanthate and aluminum cellulose xanthate are centers of crystallization. The presence of a large amount of zinc cellulose xanthate, aluminum cellulose xanthate, and hyperbranched nanocellulose facilitates the generation of uniform small crystals centered thereon, making fibers become a uniform microcrystalline structure, improving the fiber strength, not prone to breakage during the forming process, and enhancing the fiber spinnability. Third, the addition of aluminum sulfate effectively inhibits the overflow and loss of aluminum ions in the flame retardant viscose, and improves the ash content of fiber and the high temperature resistance of flame retardant. Therefore, during the forming process of the flame retardant viscose in the spinning coagulation bath, the increase in the contents of zinc sulfate and aluminum sulfate can not only effectively improve the spinnability of viscose, but also increase the strength index, flame retardant index and high temperature resistance index of fiber. The excessively high contents of zinc sulfate and aluminum sulfate not only affect economic indicators and bring difficulties to environmental protection, but also affect the fiber forming speed. Production practice has proved that the addition of hyperbranched polyamide functionalized nanocellulose and ethylenediamine modified nanocellulose facilitates zinc sulfate and aluminum sulfate to be controlled at the optimal concentrations of 25 g/L and 15 g/L, respectively.

(7) Bundling: steam pressures before and after the bundling are 0.25 MPa and 0.15 MPa, respectively, a supplementary water temperature of a plasticizing tank is greater than or equal to 80° C., controlled at 98° C. A sulfuric acid content of the plasticizing tank is 20 g/L, a main condensation bridge temperature is less than or equal to 50° C., and a final condensation temperature is less than or equal to 25° C.

(8) Drafting: a drafting ratio from a spinneret to a godet is 30%, a drafting ratio from the godet to a first set is 20%, and a drafting ratio from the first set to a second set is 7%, and a total drafting ratio is 80%.

(9) Cut offing: the drawn viscose filament is cut into a required length of 38 mm.

(10) First washing: a washing is performed at room temperature.

(11) Desulfurization: a desulfurization is conducted using a sodium sulfite solution, a concentration of the sodium sulfite solution is 4 g/L, and a temperature of the sodium sulfite solution is 75° C.

(12) Second washing: a washing is performed at room temperature.

(13) Pickling: a pickling is conducted using hydrochloric acid with a pH of 4 and room temperature.

(14) Third washing: a washing is performed at 45° C.

(15) Application of oil bath: an oil solution used has a concentration of 3 g/L, a temperature of 45° C., and a pH of 7.

The sulfuric acid and sulfate brought by the fiber from the coagulation bath, as well as water-soluble impurities such as sulfur attached to the surface of fibril are removed by washing, the sulfur and carbon disulfide in the fiber are removed by desulfurization using sodium sulfite, and alkali carried in the fiber post-treatment process is removed by pickling using weak acid. Applying an oil bath improves the degree of opening and feel of the fiber. Among the three substances of caustic soda, sodium sulfide and sodium sulfite, using sodium sulfite results in the mildest desulfurization and smallest damage to fiber strength, as such, sodium sulfite is used for desulfurization.

Ash content determination, flame retardant residual rate determination, limiting oxygen index test, breaking strength and breaking elongation test are performed on the flame retardant viscose fiber prepared in the present embodiment.

Analytical moisture test:

① Instrument and equipment: a constant temperature blasting oven having a temperature regulator, a desiccator, a flat weighing bottle, and an electronic balance having a sensitivity of 0.1 mg.

② Determination method: about 29 g (correct to 0.00019) of a wet sample is weighed accurately, and placed in a flat weighing bottle whose weight is known, followed by opening the bottle cap, and putting the flat weighing bottle along with the bottle cap into the constant temperature blasting oven. The temperature is increased to 105±2° C. for drying for 2.5 h to a constant weight, followed by transferring the weighing bottle along with the bottle cap to the desiccator for cooling and weighing.

③ Calculation:

$$\text{Analytical moisture (\%)} = \frac{G1 - G2}{G} \times 100$$

In the formula: G-weight of the sample before drying, g; G1-weight of the sample and the bottle before drying, g; G2-weight of the sample and the bottle after drying, g.

Ash content determination:

① Instrument and equipment: a high temperature furnace with a temperature regulator, a 30 ml porcelain crucible, a desiccator, a crucible clamp, and an electronic balance with a sensitivity of 0.1 mg.

② Determination method: about 49 g (correct to 0.00019) of a wet sample is weighed accurately, and put into a porcelain crucible that has been burned to a constant weight. A carbonization is conducted at 320-350° C. (below the ignition point) for about 15 min in the high temperature electric furnace until no smoke is generated. Subsequently, the temperature is raised to 750-780° C. for burning for about 2.5 h until no black carbon is generated and reaching a constant weight, followed by taking out and pre-cooling in the air for 7 min, and then placing in the desiccator for cooling and weighing.

③ Calculation:

$$\text{Ash content (\%)} = \frac{G1 - G2}{G \times (100 - W)} \times 100$$

In the formula, G1 is the weight of ash and crucible, g; G2-weight of empty crucible, g; G-weight of the wet sample, g; W-analytical moisture w %.

The test is performed 5 times, and the test results are respectively 31.2%, 31.4%, 31.8%, 32.3%, and 31.5%, with an average of 31.6%.

Flame retardant residual rate determination: the content of flame retardant in an inorganic flame retardant cellulose fiber is quickly determined by a low-field pulse nuclear magnetic resonance method, and compared with the proportion of flame retardant added relative to methylcellulose. After testing, the residual amount of the flame retardant sodium metasilicate reaches 96.2%.

Limiting oxygen index determination: five tests are performed, and the test results are respectively 32.4%, 33.7%, 34.1%, 35.3%, and 32.5%, with an average result of 33.6%.

It can be seen that the prepared flame retardant viscose has a good flame retardant residual rate and limiting oxygen index, and a desired flame retardant effect.

Dry breaking strength and dry breaking elongation tests are conducted on the flame retardant viscose fiber prepared in the present embodiment, and the test results are as follows:

|  | Test times | | | | | |
| --- | --- | --- | --- | --- | --- | --- |
|  | 1 | 2 | 3 | 4 | 5 | Average |
| Dry breaking strength of fiber/cN/dtex | 1.38 | 1.26 | 1.36 | 1.28 | 1.32 | 1.32 |
| Dry breaking elongation of fiber/% | 31.5 | 30.8 | 29.7 | 30.5 | 29.4 | 30.4 |

A method of preparing a flame retardant viscose yarn by ring spinning includes the following steps:

(a) Opening and cleaning processes: a flame retardant viscose is put on a round blow table to be grabbed, a falling speed of a cotton catcher of a scutcher is 2 mm each time, a rotation speed is 960 r/min, a rotating trolley speed is 2.8 r/min, and a blade portion extending out of a rib is 2 mm, a catcher speed is 800 r/min, a fan speed is 950 r/min, a gauge of catcher and pedal roller is 12 mm, a lap roller speed is 12 r/min, a lap dry weight is 350 g/m, and a lap length is 30.9 m;

(b) Carding process: a cylinder speed is 280 r/min, a licker-in roller speed is 590 r/min, a doffer speed is 15.8 r/min, a cover speed is 89 mm/min, a gauge of cylinder and licker-in is 7 mil, a gauge of feeding plate and linker-in is 20 mil, a gauge of cylinder and doffer is 4 mil, a gauge of cylinder and five points on the cover plate is 10 mil×9 mil×8 mil×8 mil×9 mil, and a dust removal knife has a height aligned with the frame, and the back of the knife is at an angle of 90° relative to the horizontal plane of the frame;

(c) Drawing process: a three passages drawing is conducted with each using 7 cotton slivers and having a bell mouth of 3 mm, the dry weight of the first-passage drawing is 17.5 g/5 m, the roller gauge is 12 mm×20 mm, and the mechanical drafting is 6.3 times, the rear zone drafting is 1.6 times; the dry weight of the second-passage drawing is 17.5 g/5 m, the roller gauge is 12 mm×20 mm, the mechanical drafting is 6.86 times, and the rear zone drafting is 1.4 times; the dry weight of the third-passage drawing is 17.5 g/5 m, the roller gauge is 18 mm×25 mm, the mechanical drafting is 6.86 times, the rear zone drafting is 1.3 times, and the third-passage drawing is detected as being within 4.5% using a USTER tester;

(d) Roving process: a roving twist is 3.2 twists/10 cm, a roller gauge is 28 mm×38 mm, a rear zone drafting is 1.17 times, a nip gauge is 9 mm, a roving dry weight is 5.26 g/10 m, a mechanical drafting is 6.8 times, a front roller speed is 200 r/min, a wet weight is 5.63 g/10 m, a tex number is 563 tex, a twist coefficient is 76, a front roller diameter is 28 mm, and a number of pressing palm windings is 2;

(e) Spinning process: a mechanical drafting multiple is 31.92 times, a roller gauge is 22 mm×41 mm, a rear zone drafting multiple is 1.18 times, a nip gauge is 3.5 mm, a front roller diameter is 27 mm, a front roller speed is 158 r/min; the prepared flame retardant viscose yarn has 10-20 counts, the twist is 480-710 T/m, and the twist direction is S.

The twist and strength test results of the ring-spun flame retardant viscose yarn are as follows:

| Counts/C | Twist/T/m | Strength/cN |
| --- | --- | --- |
| 10 | 580 s | 440 |
| 12 | 600 s | 440 |

-continued

| Counts/C | Twist/T/m | Strength/cN |
|---|---|---|
| 14 | 620 s | 400 |
| 16 | 660 s | 350 |
| 18 | 700 s | 300 |
| 20 | 730 s | 280 |

The flame retardant performance test of the prepared flame retardant viscose yarn is conducted and shows it meets the requirements of 16 CFR Part 1633 and the British standard BS5852.

The parameters of the rib fabric or the single jersey knitted fabric prepared by the above-mentioned ring-spun flame retardant viscose yarn are as follows:

rib fabric process data: width: 70 cm×2-150 cm×2; gram weight: 170 gsm-380 gsm.

single jersey fabric process data: width: 180 cm-240 cm; gram weight: 150 gsm-340 gsm.

For the prepared rib fabric and single jersey fabric, there is no melting, no molten drop, and no smoke generation. The prepared rib fabric and single jersey fabric have continuous burning time of 0 s, smoldering time of 0 s, and are permanent flame retardant. Furthermore, the prepared rib fabric and single jersey fabric are comfortable and soft, and maintain the same flame retardant effect as that before washing after washing 5 times, 10 times and 15 times.

The viscose flame retardant yarn fabric product, different from other flame retardant knitted fabric, is not only environmentally friendly and green (no pollution in the production process), but also permanent flame retardant because of the special post-finishing and special addition process of flame retardant, and also meets the requirements of 16 CFR Part 1633 and the British standard BS5852.

Hygroscopicity: It has good hygroscopicity. Under normal conditions, the fiber can absorb moisture from the surrounding atmosphere, and its moisture content is 8-10%, resulting in soft and flexible feel when touching the fiber. If the cloth humidity increases and the surrounding temperature is relatively high, the moisture contained in the fiber will completely evaporate, so that the fabric can maintain a moisture balance state that leads to a comfortable feel.

Moisture retention: Since the flame retardant viscose staple fiber is a poor conductor of heat and electricity, having an extremely low thermal conductivity, and because the viscose staple fiber itself is porous and highly elastic, leading to a large amount of air that is a poor conductor of heat and electricity stuck within the fiber, the flame retardant viscose fiber fabric has a good moisture retention.

Heat resistance: The viscose staple fiber fabric has good heat resistance.

Alkali resistance: The fiber is highly resistant to alkali. In an alkali solution, the fiber will not be damaged, which is conductive to washing contaminants and removing impurities after being worn.

Hygienic property: The fiber is a natural fiber, with the main component of resin viscose cellulose.

Flame retardancy: The fiber is permanent flame retardant.

Embodiment 2

The present embodiment relates to a washable flame retardant viscose fabric, the viscose fabric includes a flame retardant viscose fiber; the viscose fabric is a knitted fabric woven by a flame retardant viscose yarn, and the flame retardant viscose yarn is prepared by subjecting the flame retardant viscose fiber to a ring spinning. The viscose fabric is a rib fabric or a single jersey knitted fabric woven by the flame retardant viscose yarn. A method of preparing the viscose fiber includes the following steps:

(1) Impregnation: a cellulose pulp is put into an impregnation tank, a temperature of an impregnation solution is 58° C., impregnation time is 35 min, a concentration of the impregnation solution is 235 g/L, and V-388 used accounts for 0.10% of a content of methylcellulose.

(2) Squeezing: a raw material is squeezed and crushed with a squeezer, with a fixed weight-volume ratio of 140 g/L.

(3) Ageing: the crushed raw material is subjected to an ageing at a temperature of 55° C., and the outlet copper viscosity is 52 mp.

(4) Yellowing: carbon disulfide is added at an amount of 34% of the content of methylcellulose for yellowing for 35 min at a temperature of 30° C.

(5) Addition before spinning: before spinning, an aqueous dispersion of flame retardant, an aqueous dispersion of hyperbranched nanocellulose and a dispersant are uniformly added to a spinning glue using a pre-spinning injection system.

The aqueous dispersion of flame retardant contains 200 g/L sodium metasilicate; the aqueous dispersion of hyperbranched nanocellulose contains 100 g/L hyperbranched polyamide functionalized nanocellulose and ethylenediamine modified nanocellulose. The sodium metasilicate accounts for 46% of the content of methylcellulose calculated based on silicon dioxide.

Further, the hyperbranched polyamide functionalized nanocellulose and ethylenediamine modified nanocellulose are mixed at a ratio of (1-2):1; the dispersant is polyvinyl alcohol.

(6) Spinning: a temperature of the coagulation bath is 55° C., a concentration of sulfuric acid is 135 g/L, a concentration of zinc sulfate is 35 g/L, a concentration of aluminum sulfate is 15 g/L, a concentration of sodium sulfate is 300 g/L, a concentration of orthosilicic acid is 15 g/L, and an acid bath drop is 12 g/L.

(7) Bundling: steam pressures before and after the bundling are 0.25 MPa and 0.15 MPa, respectively, a supplementary water temperature of a plasticizing tank is greater than or equal to 80° C., controlled at 98° C. A sulfuric acid content of the plasticizing tank is 35 g/L, a main condensation bridge temperature is less than or equal to 50° C., and a final condensation temperature is less than or equal to 25° C.

(8) Drafting: a drafting ratio from a spinneret to a godet is 60%, a drafting ratio from the godet to a first set is 40%, and a drafting ratio from the first set to ae second set is 12%, and a total drafting ratio is 150%.

(9) Cut offing: the drawn viscose filament is cut into a required length of 51 mm.

(10) First washing: a washing is performed at room temperature.

(11) Desulfurization: a desulfurization is conducted using a sodium sulfite solution, a concentration of the sodium sulfite solution is 8 g/L, and a temperature of the sodium sulfite solution is 80° C.

(12) Second washing: a washing is performed at room temperature.

(13) Pickling: a pickling is conducted using hydrochloric acid with a pH of 6 and room temperature.

(14) Third washing: a washing is performed at 55° C.

(15) Application of oil bath: an oil solution used has a concentration of 6 g/L, a temperature of 55° C., and a pH of 8.5.

Ash content determination, flame retardant residual rate determination, limiting oxygen index test, breaking strength and breaking elongation test are performed on the flame retardant viscose fiber prepared in the present embodiment.

The test is performed 5 times, and the test results are respectively 31.5%, 31.1%, 31.9%, 31.7%, and 30.8%, with an average of 31.4%.

Flame retardant residual rate determination: the content of flame retardant in an inorganic flame retardant cellulose fiber is quickly determined by a low-field pulse nuclear magnetic resonance method, and compared with the proportion of flame retardant added relative to methylcellulose. After testing, the residual amount of the flame retardant sodium metasilicate reaches 95.9%.

Limiting oxygen index determination: five tests are performed, and the test results are respectively 32.7%, 33.5%, 34.6%, 35.5%, and 32.2%, with an average result of 33.7%.

It can be seen that the prepared flame retardant viscose has a good flame retardant residual rate and limiting oxygen index, and a desired flame retardant effect.

Dry breaking strength and dry breaking elongation tests are conducted on the flame retardant viscose fiber prepared in the present embodiment, and the test results are as follows:

|  | Test times | | | | | |
| --- | --- | --- | --- | --- | --- | --- |
|  | 1 | 2 | 3 | 4 | 5 | Average |
| Dry breaking strength of fiber/cN/dtex | 1.36 | 1.32 | 1.29 | 1.25 | 1.31 | 1.31 |
| Dry breaking elongation of fiber/% | 31.3 | 30.4 | 29.2 | 31.5 | 29.1 | 30.3 |

The twist and strength test results of the yarn prepared by the above-mentioned flame retardant viscose yarn are as follows:

| Counts/C | Twist/T/m | Strength/cN |
| --- | --- | --- |
| 10 | 480 s | 204 |
| 12 | 530 s | 213 |
| 14 | 580 s | 229 |
| 16 | 630 s | 252 |
| 18 | 670 s | 265 |
| 20 | 710 s | 283 |

For the prepared rib fabric and single jersey fabric, there is no melting, no molten drop, and no smoke generation. The prepared rib fabric and single jersey fabric have continuous burning time of 0 s, smoldering time of 0 s, and are permanent flame retardant. Furthermore, the prepared rib fabric and single jersey fabric are comfortable and soft, and maintain the same flame retardant effect as that before washing after washing 5 times, 10 times and 15 times.

Comparative Example

The comparative example differs from Embodiment 1 in that:

During the addition before spinning in step (5): before spinning, only the aqueous dispersion of flame retardant is uniformly added to the spinning glue using the pre-spinning injection system. The aqueous dispersion of hyperbranched nanocellulose and the dispersant are not added.

Flame retardant residual amount determination: the content of flame retardant in an inorganic flame retardant cellulose fiber is quickly determined by a low-field pulse nuclear magnetic resonance method, and compared with the proportion of flame retardant added relative to methylcellulose. After testing, the residual amount of the flame retardant sodium metasilicate reaches 87.6%.

Limiting oxygen index determination: five tests are performed, and the test results are respectively 29.4%, 30.3%, 29.5%, 31.6%, and 30.5%, with an average result of 30.26%.

The preferred embodiments of the present invention have been described in detail above. It should be understood that those of ordinary skill in the art can make many modifications and variations according to the concept of the present invention without creative work. Therefore, all technical solutions that can be obtained by those skilled in the art through logical analysis, reasoning or limited experiments according to the concept of the present invention on the basis of the prior art should fall within the protection scope defined by the claims.

The invention claimed is:

1. A method of preparing a washable flame retardant viscose fabric, wherein the viscose fabric comprises a flame retardant viscose fiber, and the method of comprises the following steps:
   (1) impregnation: putting a cellulose pulp into an impregnation tank, wherein a temperature of an impregnation solution is 56-58° C., an impregnation time is 30-35 min, a concentration of the impregnation solution is 220-235 g/L, and V-388 used accounts for 0.08-0.10% of a content of methylcellulose;
   (2) squeezing: squeezing and crushing a raw material with a squeezer, with a fixed weight-volume ratio of 130-140 g/L;
   (3) ageing: subjecting a crushed raw material to an ageing at a temperature of 52-55° C., wherein an outlet copper viscosity is 50-52 nap;
   (4) yellowing: adding carbon disulfide at an amount of 32-34% of the content of methylcellulose for yellowing for 25-35 min at a temperature of 25-30° C.;
   (5) addition before spinning: before spinning, uniformly adding an aqueous dispersion of flame retardant, an aqueous dispersion of hyperbranched nanocellulose and a dispersant to a spinning glue using a pre-spinning injection system; wherein
   the aqueous dispersion of flame retardant contains 180-200 g/L sodium metasilicate; the aqueous dispersion of hyperbranched nanocellulose contains 50-100 hyperbranched polyamide functionalized nanocellulose and ethylenediamine modified nanocellulose; and the sodium metasilicate accounts for 44-46% of the content of methylcellulose calculated based on silicon dioxide;
   (6) spinning: a temperature of the coagulation bath is 45-55° C., a concentration of sulfuric acid is 110-135 g/L, a concentration of zinc sulfate is 25-35 g/L, a concentration of aluminum sulfate is 10-15 g/L, a concentration of sodium sulfate is 270-300 g/L, a concentration of orthosilicic acid is 10-15 WL, and an acid bath drop is 6-12 g/t;
   (7) bundling: steam pressures before and after the bundling are 0.25 MPa and 0.15 MPa, respectively, a supplementary water temperature of a plasticizing tank is greater than or equal to 80° C., an acid content of the plasticizing tank is 20-35 g/L, a main condensation bridge temperature is less than or equal to 50° C., and a final condensation temperature is less than or equal to 25° C.;
(8) drafting: a drafting ratio from a spinneret to a godet is 30-60%, a drafting ratio from the godet to a first set is 20-40%, and a drafting ratio from the first set to a second set is 7-12%, and a total drafting ratio is 80-150%;
(9) cutting off;
(10) first washing: performing a washing at room temperature;
(11) desulfurization: conducting a desulfurization using a sodium sulfite solution, wherein a concentration of the sodium sulfite solution is 4-8 g/L, and a temperature of the sodium sulfite solution is 75-80° C.;
(12) second washing: performing a washing at room temperature;
(13) pickling: conducting a pickling using hydrochloric acid with a pH of 4-6 and room temperature;
(14) third washing: performing a washing at 45-55° C.;
(15) application of oil bath: an oil solution used has a concentration of 3-6 g/L, a temperature of 45-55° C., and a pH of 7-8.5;
(16) drying and packaging.

2. The method of preparing a washable flame retardant viscose fabric according to claim 1, wherein the viscose fabric is a knitted fabric woven by a flame retardant viscose yarn, and the flame retardant viscose yarn is prepared by subjecting the flame retardant viscose fiber to a ring spinning.

3. The method of preparing a washable flame retardant viscose fabric according to claim 2, wherein a method of preparing the flame retardant viscose yarn comprises the following steps:
(a) opening and cleaning processes: putting a flame retardant viscose on a round blow table to be grabbed, wherein a falling speed of a cotton catcher of a scutcher is 2 mm each time, a rotation speed is 960 r/min, a rotating trolley speed is 2.8 r/min, and a blade portion extending out of a rib is 2 mm, a catcher speed is 800 r/min, a fan speed is 950 r/min, a gauge of catcher and pedal roller is 12 mm, a lap roller speed is 12 r/min, a lap dry weight is 350 g/m, and a lap length is 30.9 m;
(b) carding process: a cylinder speed is 280 r/min, a licker-in roller speed is 590 r/min, a duffer speed is 15.8 r/min, a cover speed is 89 mm/min, a gauge of cylinder and licker-in is 7 mil, a gauge of feeding plate and linker-in is 20 mil, a gauge of cylinder and doffer is 4 mil, a gauge of cylinder and five points on the cover plate is 10 mil×9 mil×8 mil×8 mil×9 mil, and a dust removal knife has a height aligned with the frame, and the back of the knife is at an angle of 90° relative to the horizontal plane of the frame;
(c) drawing process: conducting a three passages drawing each using 7 cotton slivers and having a bell mouth of 3 mm, wherein a dry weight of a first-passage drawing is 17.5 g/5 m, a roller gauge is 12 mm×20 mm, and a mechanical drafting is 6.3 times, a rear zone drafting is 1.6 times; a dry weight of a second-passage drawing is 17.5 g/5 in, a roller gauge is 12 mm×20 mm, a mechanical drafting is 6.86 times, and a rear zone drafting is 1.4 times; a dry weight of a third-passage drawing is 17.5 g/5 m, a roller gauge is 18 mm×25 mm, a mechanical drafting is 6.86 times, a rear zone drafting is 1.3 times, and the third-passage drawing is detected as being within 4.5% using a USTER tester;
(d) roving process: a roving twist is 3.2 twists/10 cm, a roller gauge is 28 mm×38 mm, a rear zone drafting is 1.17 times, a nip gauge is 9 mm, a roving dry weight is 5.26 g/10 m, a mechanical drafting is 6.8 times, a front roller speed is 200 r/min, a wet weight is 5.63 g/10 m, a tex number is 563 tex, a twist coefficient is 76, a front roller diameter is 28 mm, and a number of pressing palm windings is 2;
(e) spinning process: a mechanical drafting multiple is 31.92 times, a roller gauge is 22 mm×41 mm, a rear zone drafting multiple is 1.18 times, a nip gauge is 3.5 mm, a front roller diameter is 27 mm, a front roller speed is 158 r/min; the prepared flame retardant viscose yarn has 10-20 counts, the twist is 480-710 T/m, and the twist direction is S.

4. The method of preparing a washable flame retardant viscose fabric according to claim 2, wherein the viscose fabric is a rib fabric or a single jersey knitted fabric woven by the flame retardant viscose yarn.

5. The method of preparing a washable flame retardant viscose fabric according to claim 1, wherein the hyperbranched polyamide functionalized, nanocellulose and ethylenediamine modified nanocellulose are mixed at a ratio of (1-2):1; the dispersant is polyvinyl alcohol.

* * * * *